US011752851B2

(12) United States Patent
Takahashi et al.

(10) Patent No.: US 11,752,851 B2
(45) Date of Patent: Sep. 12, 2023

(54) VEHICLE BATTERY WITH ADHESIVE CONNECTIONS

(71) Applicants: TOYOTA JIDOSHA KABUSHIKI KAISHA, Toyota (JP); SUBARU CORPORATION, Tokyo (JP)

(72) Inventors: Naoki Takahashi, Miyoshi (JP); Takuya Hirota, Toyota (JP); Shunji Shibata, Toyota (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 94 days.

(21) Appl. No.: 17/475,517

(22) Filed: Sep. 15, 2021

(65) Prior Publication Data

US 2022/0080820 A1    Mar. 17, 2022

(30) Foreign Application Priority Data

Sep. 17, 2020    (JP) .................................. 2020-156552

(51) Int. Cl.
| | |
|---|---|
| *B60K 1/02* | (2006.01) |
| *B60K 1/04* | (2019.01) |
| *B62D 21/11* | (2006.01) |
| *B60L 50/60* | (2019.01) |
| *B62D 27/02* | (2006.01) |

(52) U.S. Cl.
CPC ................ *B60K 1/04* (2013.01); *B60L 50/66* (2019.02); *B62D 21/11* (2013.01); *B62D 27/026* (2013.01); *B60K 2001/0438* (2013.01)

(58) Field of Classification Search
CPC ... B60K 1/04; B60K 2001/0438; B60L 50/66; B62D 21/11; B62D 27/026
See application file for complete search history.

(56) References Cited

U.S. PATENT DOCUMENTS

| | | | |
|---|---|---|---|
| 2013/0270863 A1* | 10/2013 | Young ................. | B62D 25/025 296/187.12 |
| 2019/0023321 A1 | 1/2019 | Ayukawa | |
| 2019/0263276 A1 | 8/2019 | Otoguro et al. | |

FOREIGN PATENT DOCUMENTS

| | | |
|---|---|---|
| CN | 109263455 A | 1/2019 |
| JP | 2005-154006 A | 6/2005 |
| JP | 2013-028193 A | 2/2013 |
| JP | 2019-018732 A | 2/2019 |
| JP | 2019-142421 A | 8/2019 |

* cited by examiner

*Primary Examiner* — Jason D Shanske
*Assistant Examiner* — James J Triggs
(74) *Attorney, Agent, or Firm* — Dinsmore & Shohl LLP (57) ABSTRACT

A vehicle includes a vehicle body provided with each of a pair of rockers on each side of a floor panel in a right-left direction, a battery pack that stores electric power to be supplied to a traction motor, and a pair of fixing members that fixes the battery pack to the rockers. The battery pack and the fixing members are joined by a plurality of adhesion members. The adhesion members are intermittently laid out along a vehicle length direction of the vehicle.

2 Claims, 5 Drawing Sheets

FIG. 8

VEHICLE BATTERY WITH ADHESIVE CONNECTIONS

CROSS-REFERENCE TO RELATED APPLICATION

This application claims priority to Japanese Patent Application No. 2020-156552 filed on Sep. 17, 2020, incorporated herein by reference in its entirety.

BACKGROUND

1. Technical Field

The technology of the present disclosure relates to a vehicle, and particularly relates to a vehicle provided with a battery pack below a floor panel.

2. Description of Related Art

Japanese Unexamined Patent Application Publication No. 2019-142421 (JP 2019-142421 A) describes a vehicle having a traction motor. This vehicle is provided with a vehicle body in which each of a pair of rockers is provided on each side of a floor panel. Also, a battery pack that stores electric power to be supplied to the traction motor is disposed below the floor panel.

SUMMARY

In this type of vehicle base structure, there are cases in which a pair of fixing members is used to fix the battery pack to the rockers. The fixing members are disposed on the both sides of the battery pack, in the right-left direction. There are cases in which both sides of the battery pack and the fixing members are joined by an adhesive. When performing repairs or recycling the battery pack, the battery pack and the fixing members need to be cut to be separated from each other, but cutting and separation are difficult in some cases.

The technology of the present disclosure relates to a vehicle that includes a traction motor. The vehicle includes a vehicle body provided with a pair of rockers, a battery pack configured to store electric power to be supplied to the traction motor, and a pair of fixing members configured to fix the battery pack to the rockers. The rockers are each provided on an outer side of a floor panel in a vehicle width direction. The battery pack is disposed below the floor panel. The fixing members are each disposed on an outer side of the battery pack in the vehicle width direction. The fixing members are configured to be joined to the battery pack by a plurality of adhesion members. The adhesion members are intermittently laid out along a vehicle length direction of the vehicle.

The adhesion members that join the battery pack and the fixing members are intermittently laid out along the vehicle length direction. Accordingly, cutting and separation of the battery pack and the fixing members can be facilitated as compared to when the adhesion members are laid out continuously along the vehicle length direction.

The battery pack may be provided with a case configured to store a plurality of battery stacks. The case may be provided with a pair of side walls configured to face the fixing members, and a reinforcement configured to connect the side walls. The reinforcement may extend in the vehicle width direction within the case. The adhesion members may be laid out in at least a part of a second region that is a part of one face of the side walls. The one face of the side walls joining to the fixing members. The second region may be a region at a position corresponding to a first region that is a part of the other face of the side walls. The first region may be a region configured such that the reinforcement is connected. In the side walls, the region where the reinforcement is connected is a region with higher strength than a region where the reinforcement is not connected. Joining stiffness can be increased by joining the battery pack and the fixing members at this high-strength region.

A joining region at which the side walls and the fixing members are joined may be configured to extend along the vehicle length direction of the vehicle on at least a part of the side walls. The adhesion members may include a first adhesion member laid out in a vehicle-upper side region of the joining region. The case side walls and the fixing members can be joined at the vehicle-upper side of the joining region.

A joining region at which the side walls and the fixing members are joined may be configured to extend along the vehicle length direction of the vehicle on at least a part of the side walls. The adhesion members may include a second adhesion member laid out in a vehicle-lower side region of the joining region. The case side walls and the fixing members can be joined at the vehicle-lower side of the joining region.

A joining region at which the side walls and the fixing members are joined may be configured to extend along the vehicle length direction of the vehicle on at least a part of the side walls. The adhesion members may include a first adhesion member laid out in a vehicle-upper side region of the joining region, and a second adhesion member laid out at a vehicle-lower side as compared to the first adhesion member. The case side walls and the fixing members can be joined at the vehicle-upper side and the lower side of the joining region. Accordingly, joining stiffness in the vehicle up-down direction can be increased.

The first adhesion member and the second adhesion member may be laid out alternately along the vehicle length direction of the vehicle. Laying out the first and second adhesion members alternately enables the layout of the adhesion members to be uniformly distributed. The joining stiffness within the joining region can be made uniform.

The adhesion members may include a third adhesion member. The third adhesion member is configured such that one end of the third adhesion member is laid out rearward in the vehicle length direction of the vehicle on a vehicle-upward side or a vehicle-downward side with respect to the other end of the third adhesion member. The joining stiffness can be increased in the vehicle length direction and the vehicle up-down direction.

The adhesion members may include a third adhesion member. The third adhesion member is configured such that one end of the third adhesion member is laid out rearward in the vehicle length direction of the vehicle on a vehicle-upward side or a vehicle-downward side with respect to the other end of the third adhesion member. The third adhesion member may be configured to be connected to at least one of the first adhesion member and the second adhesion member. The joining stiffness can be increased in the vehicle length direction and the vehicle up-down direction.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Configuration of Vehicle

Figure 1:
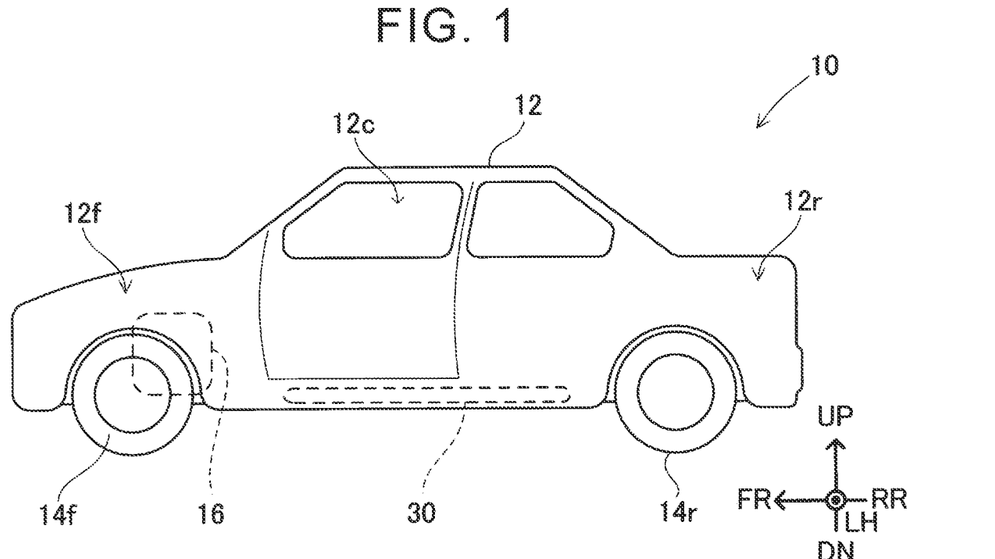
FIG. 1 is a left-side view of a vehicle 10.

FIG. 1 illustrates a left-side view of a vehicle 10. The vehicle 10 according to a first embodiment is a so-called automobile, and is a vehicle that travels over a road surface. Note that the direction FR in FIGS indicates forward in the front-rear direction (vehicle-length direction) of the vehicle 10, and the direction RR indicates rearward in the front-rear direction of the vehicle 10. Also, the direction LH indicates leftward in the right-left direction (vehicle-width direction) of the vehicle 10, and the direction RH indicates rightward in the right-left direction of the vehicle 10. The direction UP indicates upward in the up-down direction (vehicle-height direction) of the vehicle 10, and the direction DN indicates downward in the up-down direction of the vehicle 10. Note that in the present specification, the front-rear direction, the right-left direction, and the up-down direction, of the vehicle 10 may be referred to simply as the front-rear direction, the right-left direction, and the up-down direction, respectively.

The vehicle 10 is provided with a vehicle body 12, a plurality of wheels 14$f$ and 14$r$, a traction motor 16, and a battery pack 30. Note that the number of the wheels 14$f$ and 14$r$ is not limited to four. The vehicle body 12 can be primarily sectioned into a cabin 12$c$ in which a user rides, a front portion 12$f$ located forward of the cabin 12$c$, and a rear portion 12$r$ located rearward of the cabin 12$c$.

The traction motor 16 is connected to a pair of front wheels 14$f$, and drives the front wheels 14$f$. The battery pack 30 is a power source for supplying electric power to the traction motor 16, and stores electric power to be supplied to the traction motor 16. The battery pack 30 is electrically connected to the traction motor 16 via power supply circuits (omitted from illustration) such as a direct current-direct current (DC-DC) converter, an inverter, and so forth. The vehicle 10 may also have another prime mover such as an engine, in addition to or instead of the traction motor 16.

Figure 2:
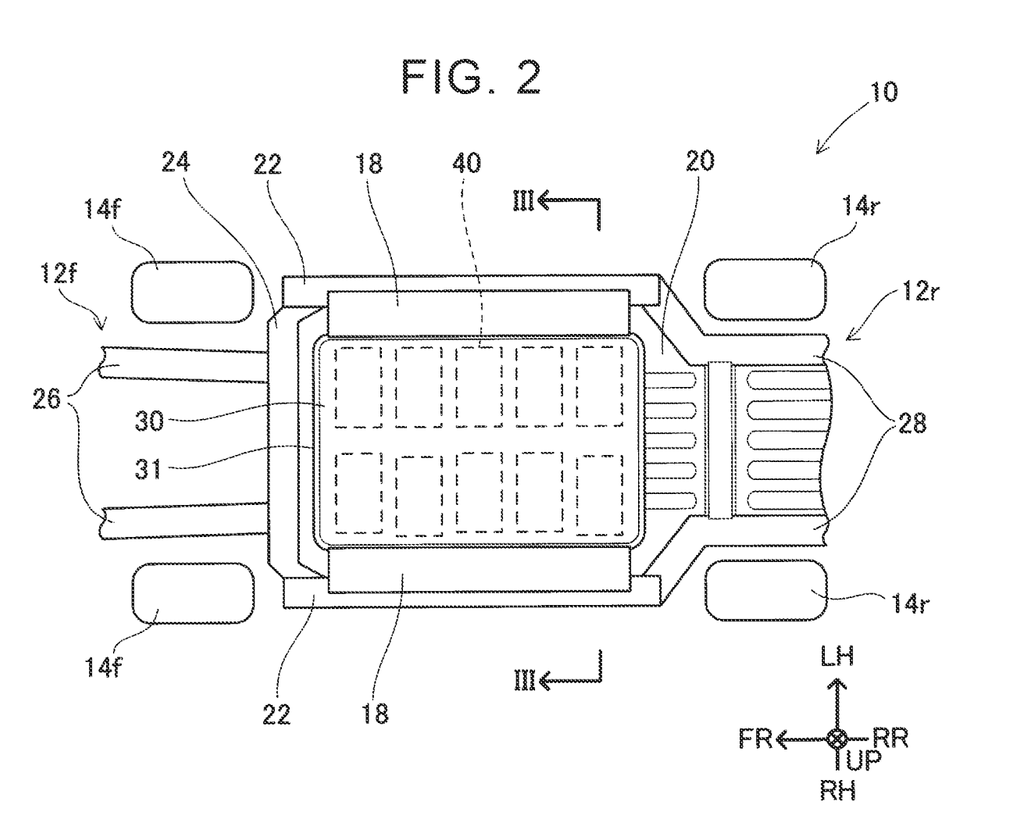
FIG. 2 is a bottom view of the vehicle 10.

FIG. 2 is a bottom view schematically illustrating primary structures of the vehicle 10. The vehicle body 12 is provided with a floor panel 20, a pair of rockers 22, a dash cross member 24, a pair of front side members 26, and a pair of rear side members 28. The floor panel 20 is a plate-like member that extends in the front-rear direction and the right-left direction, and that makes up a floor of the cabin 12$c$. The rockers 22 (also referred to as "side sills") are positioned at the cabin 12$c$, and are provided on the both sides of the floor panel 20 in the right-left direction. Each of the rockers 22 has a generally tubular structure, and extends in the front-rear direction. The rockers 22 each make up a part of a framework of the vehicle body 12. The front end portions of the rockers 22 are connected to the dash cross member 24, and the rear end portions of the rockers 22 are connected to the rear side members 28.

The dash cross member 24 is positioned at a boundary between the cabin 12$c$ and the front portion 12$f$, and extends from the front end of one rocker 22 to the front end of the other rocker 22. The dash cross member 24 has a generally tubular structure, and extends in the right-left direction. The dash cross member 24 makes up a part of the framework of the vehicle body 12. The front side members 26 are positioned in the front portion 12$f$, and extend forward from the dash cross member 24. Each of the front side members 26 has a generally tubular structure, and extends in the front-rear direction. The front side members 26 make up a part of the framework of the vehicle body 12. The rear side members 28 are positioned in the rear portion 12$r$, and extend rearward continuing from the rockers 22. Each of the rear side members 28 has a generally tubular structure, and extends in the front-rear direction. The rear side members 28 make up a part of the framework of the vehicle body 12.

The battery pack 30 is disposed below the floor panel 20 of the vehicle body 12, and is fixed to the rockers 22 with a pair of energy absorber (EA) members 18 interposed therebetween. That is to say, the EA members 18 are a pair of fixing members for fixing the battery pack 30 to the rockers 22. The EA members 18 each extend in the front-rear direction on both sides of the battery pack 30 in the right-left direction. The EA members 18 are members for absorbing energy at the time of a collision, and are configured to cause predetermined plastic deformation in accordance with the collision load. The material and structure of the EA members 18 are not limited in particular. The EA members 18 according to the present embodiment are configured of an aluminum material, as one example.

Structure of Battery Pack and EA Members

Figure 3:
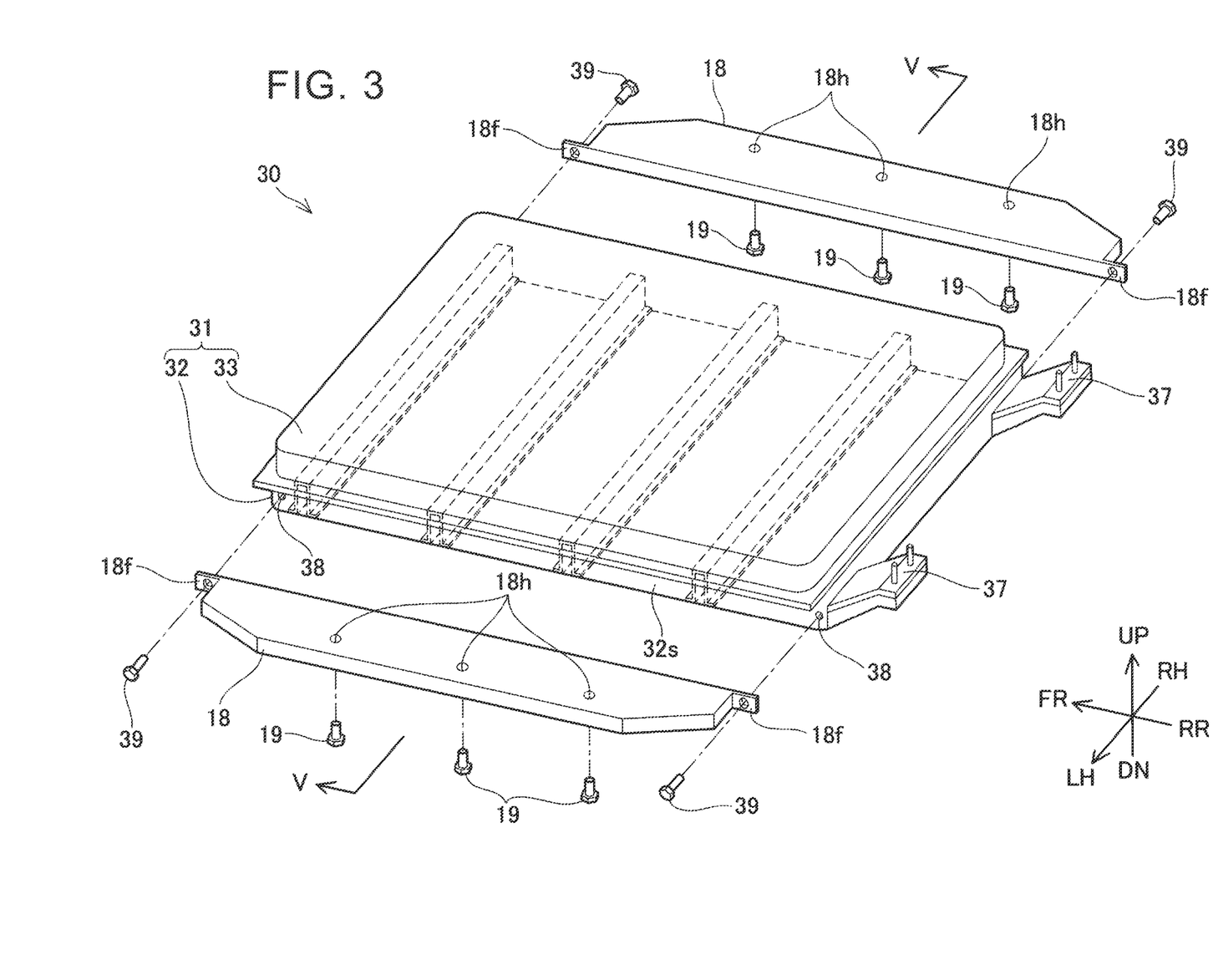
FIG. 3 is a disassembled perspective view of a battery pack 30 and an energy absorber (EA) member 18.
Figure 4:
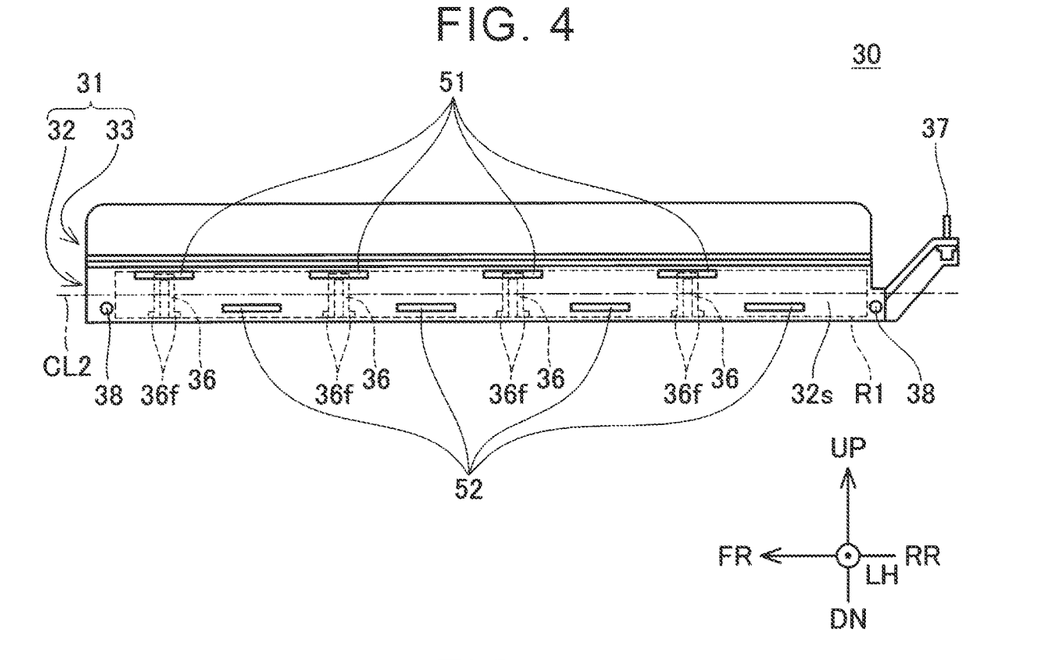
FIG. 4 is a side view of a battery pack 30 according to a first embodiment.
Figure 5:
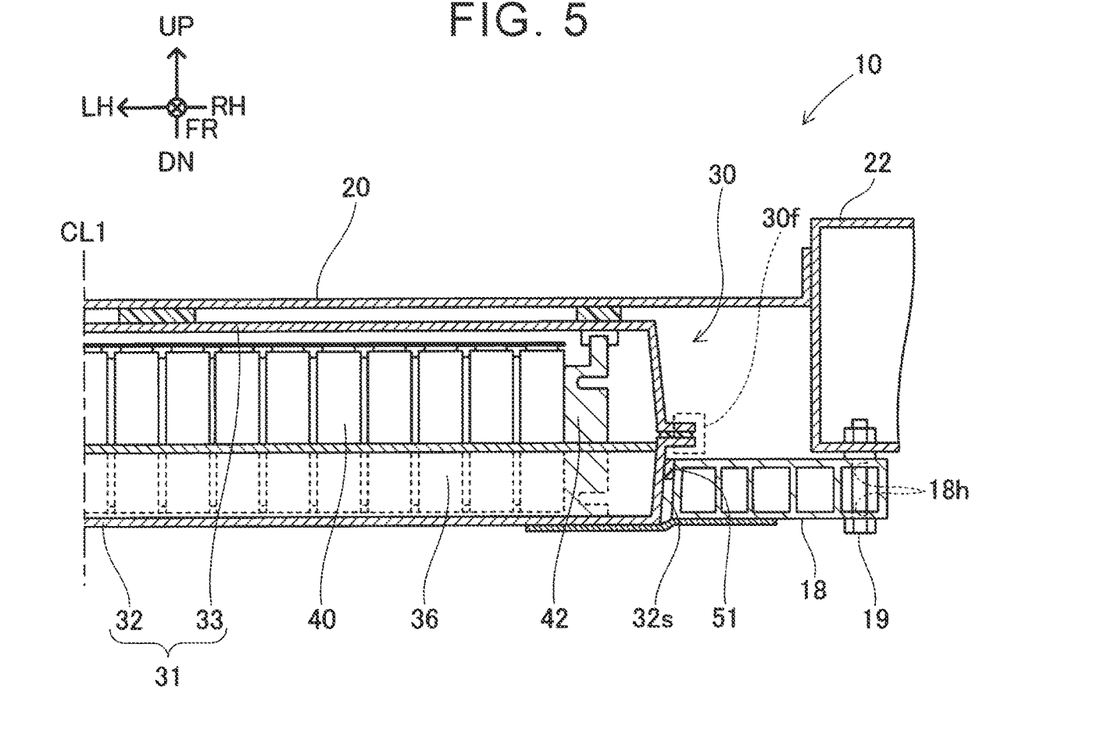
FIG. 5 is a cross-sectional view taken along line V-V in FIG. 3.

FIG. 3 is a disassembled perspective view of the battery pack 30 and the EA members 18. In-pack cross members 36 that are hidden by an upper-side case 33 are indicated by dashed lines in FIG. 3. FIG. 4 is a side view of the battery pack 30. FIG. 5 is a cross-sectional view, taken along line V-V in FIG. 3. Line V-V is a line passing through the center of the in-pack cross members 36. FIG. 5 is a diagram illustrating a state in which the battery pack 30, the EA members 18, and the rockers 22 are all assembled. The structure is symmetrical in the right-left direction, and accordingly only the right side of a center line CL1 is illustrated in FIG. 5.

The battery pack 30 is provided with a case 31, a plurality of battery cells 40, and end plates 42. The case 31 is a member that makes up an outer shell of the battery pack 30. The case 31 is provided with a lower-side case 32, the upper-side case 33, the in-pack cross members 36, fastening members 37, and bolt holes 38. The lower-side case 32 has a dish-like shape that is recessed to the lower side. The upper-side case 33 has a lid-like shape that protrudes to the upper side. These two are joined by flange portions 30$f$ (see FIG. 5), thereby forming an interior space. The fastening members 37 are members for fixing the battery pack 30 to the lower face of the vehicle body 12.

The lower-side case 32 has a pair of side walls 32$s$ on the right and left sides thereof. The side walls 32$s$ face the EA members 18. The in-pack cross members 36 are provided inside the lower-side case 32, extending in the vehicle width direction. The in-pack cross members 36 connect the side walls 32s. The regions of the side walls 32s that connect to the in-pack cross members 36 here are an example of a "first region". The "first region" is portions on the faces of the side walls 32s on the inner side of the case. Also, regions of the side walls 32s on a part of the faces facing the EA members 18 at positions that correspond to the "first region" are an example of a "second region". The in-pack cross members 36 are frame members for raising the strength of the lower-side case 32, and are also referred to as "reinforcement". The in-pack cross members 36 are hidden by the side wall 32s in FIG. 4, and accordingly are indicated by dashed lines. The in-pack cross members 36 are formed by welding steel plates having a double-hat cross-sectional profile to a bottom face of the lower-side case 32, as illustrated in FIG. 4. Specifically, closed cross-sectional shapes are formed by welding flanges 36f located on both sides of the in-pack cross members 36 in the width direction to the bottom face of the lower-side case 32.

The battery cells 40 are stored in the interior space of the case 31, as illustrated in FIG. 5. Each of the battery cells 40 is a secondary battery cell such as a lithium-ion battery cell, for example. The battery cells 40 are repeatedly chargeable by electric power supplied from an external power source and regenerative power from the traction motor 16. The battery cells 40 are arrayed in rows in the right-left direction of the vehicle. The end plates 42 are plate-like members that extend in the up-down direction, and are disposed at the right and left ends of the rows of the battery cells 40. The end plates 42 press the battery cells 40 in the direction of array thereof.

The EA members 18 are joined to the side walls 32s of the lower-side case 32. In the present specification, regions where the side walls 32s and the EA members 18 are joined is defined as "joining region R1". As illustrated in FIG. 4, the joining regions R1 extend following the side walls 32s. That is to say, the joining regions R1 extend in the front-rear direction. First adhesion members 51 and second adhesion members 52 are laid out in the joining regions R1. These adhesion members are members used for adhesion of the lower-side case 32 and the EA members 18. In the present embodiment, the first adhesion members 51 and the second adhesion members 52 are double sided adhesive tape.

A plurality of the first adhesion members 51 is intermittently laid out along the front-rear direction. The first adhesion members 51 are adhesion members laid out in a region at the vehicle-upper side of the joining region R1. Specifically, the first adhesion members 51 are laid out on an upper side from a center line CL2 that sections the joining region R1 in the up-down direction. Also, there are regions in the joining region R1 where the in-pack cross members 36 are connected, as indicated by dashed-line regions in FIG. 4. The first adhesion members 51 are laid out in at least a part of the regions where the in-pack cross members 36 are connected. In other words, a part of the first adhesion members 51 is overlapped with regions where the in-pack cross members 36 are connected, in side view of the battery pack 30.

A plurality of the second adhesion members 52 is intermittently laid out along the front-rear direction. The second adhesion members 52 are adhesion members laid out at the vehicle-lower side than the first adhesion members 51. Specifically, the second adhesion members 52 are laid out on a lower side from the center line CL2. The first adhesion members 51 and the second adhesion members 52 are laid out alternately along the front-rear direction.

Returning to description of FIG. 3, the EA members 18 are provided with flange portions 18f and holes 18h. Bolts 39 are passed through the flange portions 18f, and are fixed to bolt holes 38. Thus, the EA members 18 can be fixed to the lower-side case 32. Also, bolts 19 are passed through the holes 18h and are fixed to bolt holes (omitted from illustration) at the lower faces of the rockers 22. Thus, the EA members 18 can be fixed to the rockers 22.

Advantages

Figure 6:
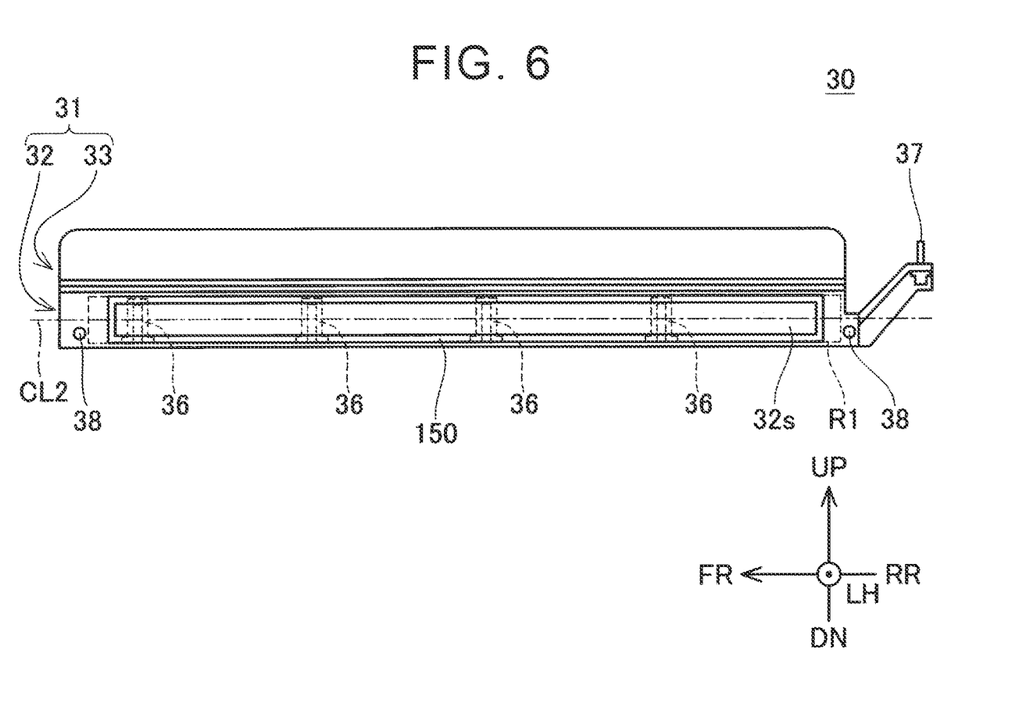
FIG. 6 is a side view of a battery pack according to a comparative example.

FIG. 6 illustrates a comparative example for describing advantages. FIG. 6 is a side view corresponding to FIG. 4. In the comparative example, an adhesive 150 is disposed at the four sides of the joining regions R1 so as to surround the joining regions R1. That is to say, the adhesive 150 is continuously disposed following the front-rear direction. When performing repairs or recycling the battery pack 30, the battery pack 30 and the EA members 18 need to be cut and separated from each other. However, in the comparative example in FIG. 6, the adhesive 150 continuously disposed along the front-rear direction becomes an obstruction and makes it difficult to insert a common tool such as a cutter or the like to the joined face. Accordingly, there are cases in which a dedicated tool for cutting and separation becomes necessary. Continuously disposing the adhesive 150 unnecessarily raises the strength of adhesion, and there are cases in which cutting and separation are difficult. Accordingly, in the technology according to the first embodiment, the first adhesion members 51 and the second adhesion members 52 are intermittently laid out along the front-rear direction, as illustrated in FIG. 4. This enables easy insertion of a tool such as a cutter or the like to the joined face, from regions where no adhesive is laid out. Therefore, cutting and separation can be facilitated. Also, adjusting the layout proportion of regions where the adhesive is laid out allows the strength of adhesion to be optimized, so that sufficient joining stiffness is provided, while facilitating cutting and separation.

In the side walls 32s, the regions where the in-pack cross members 36 are connected (see the dashed-line regions in FIG. 4) are regions where the strength is high as compared to regions where the in-pack cross members 36 are not connected. These high-strength regions do not readily deform under external force, and greatly contribute to raising the joining stiffness. Laying out the first adhesion members 51 in these high-strength regions enables the battery pack 30 and the EA members 18 to be joined in the high-strength regions, and accordingly the joining stiffness of the two can be increased.

Laying out the first adhesion members 51 and the second adhesion members 52 alternately along the front-rear direction enables the layout density of the adhesion members within the joining regions R1 to be made uniform. Making the layout adhesion strength within the joining regions R1 to be uniform enables the overall adhesion strength of the joining region R1 to be increased.

Second Embodiment

Figure 7:
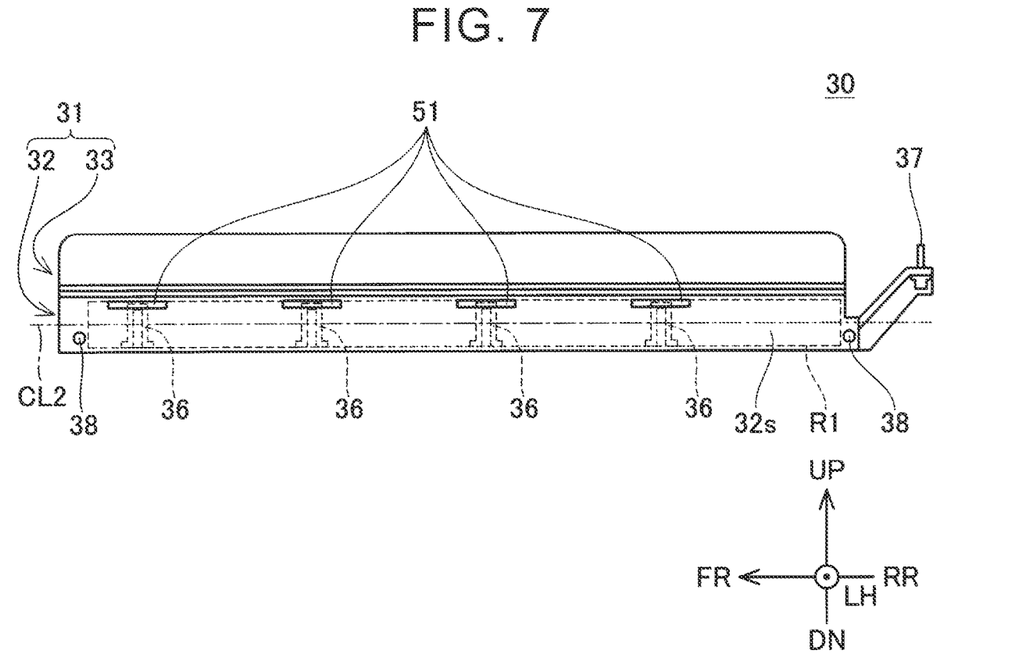
FIG. 7 is a side view of a battery pack 30 according to a second embodiment.

FIG. 7 illustrates a layout pattern of adhesive according to a second embodiment. FIG. 7 is a diagram corresponding to FIG. 4 in the first embodiment. Note that portions that are the same as in the first embodiment are denoted by the same signs, and description thereof will be omitted. This holds true in the following other embodiments as well. Just the first adhesion members 51 are laid out in the joining regions R1. The first adhesion members 51 are laid out intermittently in the front-rear direction. The first adhesion members 51 are also laid out in at least a part of the regions where the in-pack cross members 36 are connected.

Accordingly, the side walls 32s and the EA members 18 can be joined at the vehicle-upper side of the joining regions R1. The region over which a tool such as a cutter or the like is to be moved when cutting and separating the battery pack 30 and the EA members 18 can be made to be just the upper side of the joining face. Accordingly, cutting and separation can be facilitated.

Third Embodiment

Figure 8:
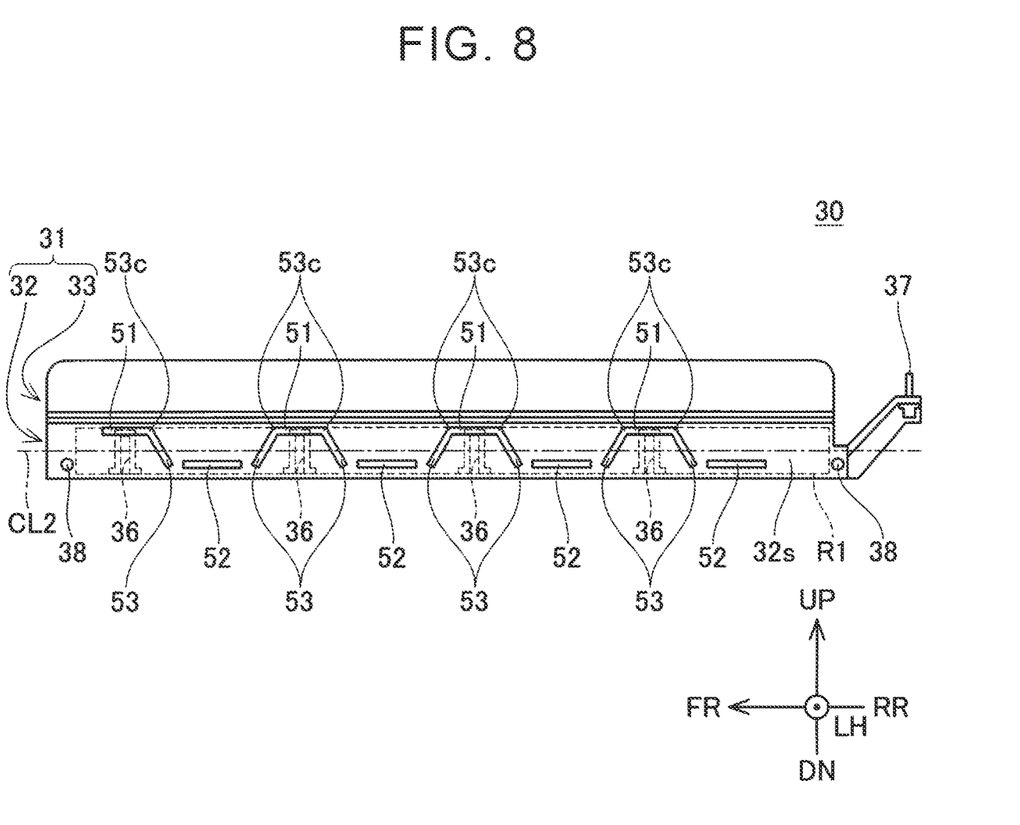
FIG. 8 is a side view of a battery pack 30 according to a third embodiment.

FIG. 8 illustrates a layout pattern of adhesive according to a third embodiment. Along with the first adhesion members 51 and the second adhesion members 52 described in the first embodiment (FIG. 4) being laid out in the joining regions R1, a plurality of third adhesion members 53 is also additionally laid out. In the third adhesion members 53, the one end of the third adhesion member 53 is laid out rearward in the front-rear direction on the vehicle-upward side or the vehicle-downward side with respect to the other end of the third adhesion member 53. In other words, the third adhesion members 53 are laid out obliquely as to the front-rear direction. The third adhesion members 53 are also each connected to an end portion of the first adhesion member 51 in the front rear direction, at connecting portions 53c.

The adhesion strength in the front-rear direction and the up-down direction can be increased by the third adhesion members 53 laid out obliquely.

Although embodiments have been described above in detail, these are only exemplifications, and do not limit the Claims. The technology set forth in the Claims includes various modifications and alterations of the specific example exemplified above. Technical elements described in the present specification or the drawings exhibit technical utility, either singularly or through various types of combinations, and do not limit combinations set forth in the Claims at the time of application. Also, the technology exemplified in the present specification or the drawings may achieve a plurality of objects simultaneously, and achieving one of these objects in itself has technical utility.

Modifications

A case in which the adhesion members are double sided adhesive tape has been described, but this form is not limiting, a liquid adhesive may be coated on the adhesion face.

The layout form of the adhesion members in the joining regions R1 is not limited to that in the examples in the present specification, and various arrangements may be made. For example, in the layout form of the first embodiment (FIG. 4), the number of the first adhesion members 51 and the second adhesion members 52 laid out may be thinned out as appropriate. In the layout form of the first embodiment (FIG. 4) the first adhesion members 51 may all be thinned out, leaving only the second adhesion members 52. Also, in the layout form of the third embodiment (FIG. 8) the first adhesion members 51 and the second adhesion members 52 may all be thinned out, leaving only the third adhesion members 53. Further, adhesion members may be laid out in the up-down direction of the vehicle (i.e., upright).

The structure of "regions of the side walls 32s to which the in-pack cross members 36 are connected" is not limited to that in the examples in the present specification, and various arrangements may be made. For example, the in-pack cross members 36 may be connected to the side walls 32s via various types of linking members. Examples of linking members include stays, brackets, reinforcement portions formed by weld beads, and so forth.

The EA members 18 are an example of fixing members.

What is claimed is:

1. A vehicle that includes a traction motor, the vehicle comprising:
   a vehicle body provided with a pair of rockers, the rockers each being provided on an outer side of a floor panel in a vehicle width direction;
   a battery pack configured to store electric power to be supplied to the traction motor, the battery pack being disposed below the floor panel; and
   a pair of fixing members configured to fix the battery pack to the rockers, the fixing members each being disposed on an outer side of the battery pack in the vehicle width direction, and the fixing members being configured to be joined to the battery pack by a plurality of adhesion members, the adhesion members being intermittently positioned along a vehicle length direction of the vehicle, wherein:
   the battery pack is provided with a case configured to store a plurality of battery stacks;
   the case is provided with:
      a pair of side walls configured to face the fixing members; and
      a reinforcement configured to connect the side walls, the reinforcement extending in the vehicle width direction within the case;
   the adhesion members are positioned in at least a part of a second region that is a part of one face of the side walls, the one face of the side walls configured to join to the fixing members, the second region being a region at a position corresponding to a first region that is a part of the other face of the side walls, the first region being a region configured such that the reinforcement is connected;
   a joining region at which the side walls and the fixing members are joined is configured to extend along the vehicle length direction of the vehicle on at least a part of the side walls; and
   the adhesion members include:
      a first adhesion member positioned in the second region in a vehicle-upper side region of the joining region;
      a second adhesion member positioned in a region other than the second region at a vehicle-lower side as compared to the first adhesion member; and
      a third adhesion member configured such that one end of the third adhesion member is positioned rearward in the vehicle length direction of the vehicle on a vehicle-upward side or a vehicle-downward side with respect to the other end of the third adhesion member such that the third adhesion member is oblique with respect to a front-rear direction.

2. A vehicle that includes a traction motor, the vehicle comprising:
   a vehicle body provided with a pair of rockers, the rockers each being provided on an outer side of a floor panel in a vehicle width direction;
   a battery pack configured to store electric power to be supplied to the traction motor, the battery pack being disposed below the floor panel; and
   a pair of fixing members configured to fix the battery pack to the rockers, the fixing members each being disposed on an outer side of the battery pack in the vehicle width direction, and the fixing members being configured to be joined to the battery pack by a plurality of adhesion members, the adhesion members being intermittently positioned along a vehicle length direction of the vehicle, wherein:

the battery pack is provided with a case configured to store a plurality of battery stacks;

the case is provided with:
- a pair of side walls configured to face the fixing members; and
- a reinforcement configured to connect the side walls, the reinforcement extending in the vehicle width direction within the case;

the adhesion members are positioned in at least a part of a second region that is a part of one face of the side walls, the one face of the side walls configured to join to the fixing members, the second region being a region at a position corresponding to a first region that is a part of the other face of the side walls, the first region being a region configured such that the reinforcement is connected;

a joining region at which the side walls and the fixing members are joined is configured to extend along the vehicle length direction of the vehicle on at least a part of the side walls; and the adhesion members include:
- a first adhesion member positioned in a vehicle-upper side region of the joining region;
- a second adhesion member positioned at a vehicle-lower side as compared to the first adhesion member, the first adhesion member and the second adhesion member are positioned alternately along the vehicle length direction of the vehicle; and
- a third adhesion member configured such that one end of the third adhesion member is positioned rearward in the vehicle length direction of the vehicle on a vehicle-upward side or a vehicle-downward side with respect to the other end of the third adhesion member such that the third adhesion member is oblique with respect to a front-rear direction, the third adhesion member is configured to be connected to at least one of the first adhesion member and the second adhesion member.

\* \* \* \* \*